July 21, 1925.
F. C. HAMILTON
OIL SEPARATOR
Filed Sept. 29, 1923
1,546,655
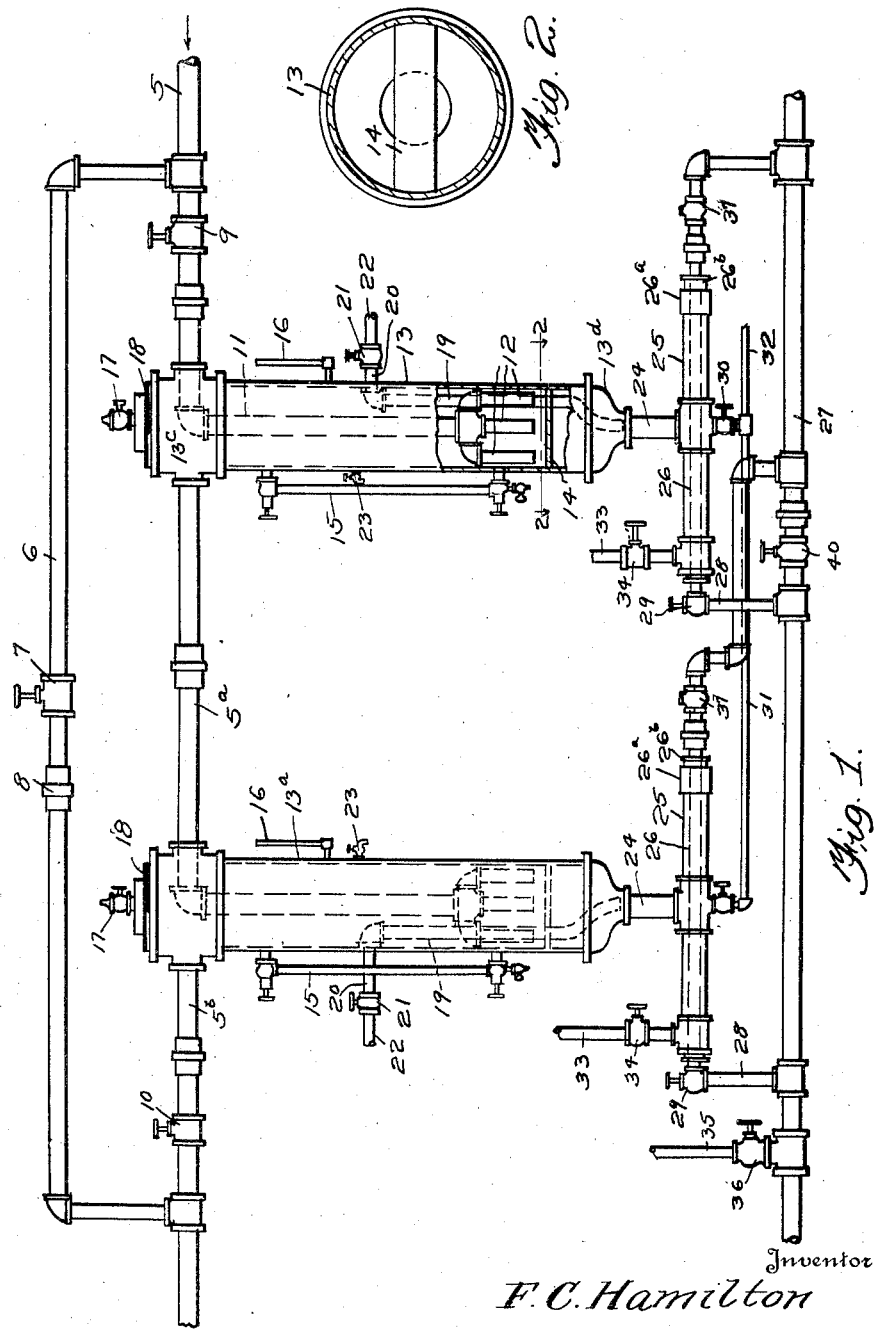
Inventor
F. C. Hamilton
By Shepherd & Campbell
Attorneys Patented July 21, 1925.

1,546,655

UNITED STATES PATENT OFFICE.

FELIX C. HAMILTON, OF BELOIT, KANSAS.

OIL SEPARATOR.

Application filed September 29, 1923. Serial No. 665,578.

*To all whom it may concern:*

Be it known that I, FELIX C. HAMILTON, a citizen of the United States, residing at Beloit, in the county of Mitchell and State of Kansas, have invented certain new and useful Improvements in Oil Separators, of which the following is a specification, reference being had therein to the accompanying drawings.

This invention relates to an oil separator. Its primary object is to provide a separator adapted to remove all water from distillate or crude and fuel oils of various kinds before such oils are used for power or heating purposes.

However, the invention is not limited to the use stated but is of utility in any relation where oil and water are to be separated in a continuous operation.

In the accompanying drawing:

Fig. 1 is a view partly in side elevation and partly in section of an oil separator constructed in accordance with the invention; and Fig. 2 is a horizontal sectional view on line 2—2 of Fig. 1 illustrating a baffle plate hereinafter described.

Like numerals designate corresponding parts in both of the figures of the drawing.

The oil to be treated enters the apparatus through an oil service pipe 5 and is discharged from the apparatus and continues on its way to oil burners (not shown) where it is to be consumed. A by-pass 6 having a shut-off valve 7 and a union 8 in its length provides means for continuing the supply to the burners, if the separator has to be cut out of action for any reason. If it is desired to cut the separator out of action the valve 7 is opened and valves 9 and 10 are closed. Assuming the separator to be in action and the valve 7 to be closed, the oil which enters at pipe 5 is discharged through a vertical leg 11 and a distributor head 12 comprising a plurality of pipes into the lower part of a casing 13 constituting a separating chamber. A baffle plate 14 spans this casing and the incoming streams from the distributor-pipe 12 are checked by this baffle plate. By referring to Fig. 2 it will be seen that this baffle plate does not span the entire circumference of the casing 13 but terminates short of the sides thereof along two of its edges so that communication is established between those portions of the casing which lie above and below said baffle plate.

The level of the oil rises in the casing until the uppermost of the oil flows off through a branch $5^a$ of the oil service pipe into a second casing $13^a$ corresponding to the casing 13 and containing the same instrumentalities to which the same reference characters have been applied. From this second casing $13^a$ the oil flows through a branch pipe $5^b$ to the outlet. Each of the casings 13, $13^a$ is provided with a gauge glass of a usual and well known type, indicated at 15, by means of which the respective oil and water levels may be viewed. Thermometers 16 carried by the casings 13, $13^a$ provide means for determining the temperature of the oil which, as will be presently set forth is maintained at a point to efficiently bring about a complete separation of the oil and water as rapidly as the oil is discharged to the burners. Blow-off cocks 17 are carried by plugs 18 screwed into the tops of the casings 13, $13^a$, and provide means for discharging any air which may collect in the apparatus to thus prevent the apparatus from becoming air-bound.

The water which collects in the lower portions of the casings 13, $13^a$ rises in vertical pipes 19 and is discharged through horizontal branches 20 of said pipes, through valve 21, and common discharge pipe 22, which may lead to the open or to a sewer. Valves 23 provide means for drawing off from the casings 13, $13^a$ any substance of a specific gravity between that of the oil and the water and which may be contained therein. It is desirable to maintain the oil at an elevated temperature; approximately 140 degrees, during the operation of the apparatus and I utilize the water collected in the lower part of the apparatus as a heat transfer medium by which the oil may be maintained at the desired temperature. To this end the lower portions of the casings 13, $13^a$ are connected by pipe 24 with headers 25 through which steam pipes 26 pass. Thus the water collected in the headers is heated by the steam pipe and this, in turn, elevates the temperature of the oil. While steam may be supplied to the steam pipes 26 from any desired source, great economy in operation is brought about by utilizing the exhaust steam from the pump by which the oil is pumped to the burners (not shown). Thus 27 may be the exhaust line from a pump of the character indicated and branches 28 leading from this pipe are provided with valves 29 which control the flow of steam into the steam pipe 26.

After a shut-down and after the water in the lower portions of the separating chambers has become cold and it is desired to restore the elevated temperature in the separating chambers, this may be accomplished by opening valve 30 and draining off the cold water through a header 31 and a discharge pipe 32 and thereafter admitting hot water from the boiler feed pipes 33 by opening valve 34. A high pressure steam supply line 35 is provided with a valve 36 through which steam may be admitted to the exhaust line of the pump. This is used only when starting after a shut-down or in extremely cold weather or when unloading from a railroad car to a storage plant in very cold weather. Under such circumstances as these an additional steam supply from the exhaust line may be found desirable in order to maintain the elevated temperature of the oil.

Check valves 37 are located in the by-pass connections constituting the steam lines 26 and aid in maintaining circulation in said steam pipe and preventing back pressure in the wrong direction thereon. A valve 40 on the exhaust line of the pump is intended to be closed when high pressure steam is admitted to this line, as above set forth. It will be observed that the connections to pipes 28 are both located on the same side of the valve 40 as the live steam pipe 35. Thus the valve 40 prevents the live steam from finding its way to the pump through the exhaust line.

Particular emphasis is laid upon the fact that the device herein shown and described is susceptible of very economical construction. Practically every part may be made with an ordinary pipe fitting. Even the receiving chambers may be made of large pipe fittings it being observed that the barrel portions are of sections of pipe, that the upper portion is an ordinary cross 13ᶜ with the plug 18 screwed into its top and that the bottom thereof is constituted by an ordinary reducing fitting 13ᵈ. In like manner the headers 25 consist of sections of pipe with a T at one end having a bushing in it through which the steam pipe 26 extends. At its other end it is provided with an ordinary coupling 26ᵃ which receives a bushing 26ᵇ of a common type.

It is to be understood that the invention is not limited to the precise construction set forth but that it includes within its purview whatever changes fairly come within either the terms or the spirit of the appended claims.

Having described my invention, what I claim is:

1. A device of the character described comprising a pair of casings, means for connecting said casings into a pressure oil feed line to form a part thereof and to operate under the pressure therein, an oil pipe leading into one of said casings adjacent the upper end thereof and extending downwardly therein and having a distributing head at is end, a baffle plate below said distributing head, a water overflow pipe leading from the lower portion of the casings and discharging therefrom at an elevated point and above the distributing head, an elongated horizontal header to which the lower portion of the casing is connected, a steam pipe extending through said header, an exhaust steam line to which said steam pipe is connected, means for supplying live steam to a part of the exhaust steam line and from said part of the exhaust steam line to the steam pipe while preventing the passage of said live steam to the remainder of the exhaust steam line.

2. A device of the character described comprising a casing, means for connecting said casing into a pressure oil feed line to form part thereof and to operate under the pressure therein, a vertical extension from the said oil feed line extending from a point adjacent the top of said casing, downwardly therein and having a distributing head at its end, a baffle plate below said distributing head, a water overflow pipe leading from the power portion of the casing and discharging therefrom at an elevated point and above the distributing head, an elongated horizontal header to which the lower portion of the casing is connected, a steam pipe extending through said header, an exhaust steam line to which said steam pipe is connected and means for supplying live steam to a part of the exhaust steam line and from said part of the exhaust steam line to the steam pipe while preventing the passage of said live steam to the remainder of the exhaust steam line.

In testimony whereof I hereunto affix my signature.

FELIX C. HAMILTON.